(12) United States Patent
Masegi (10) Patent No.: US 6,522,043 B2
(45) Date of Patent: Feb. 18, 2003

(54) VEHICLE AC GENERATOR

(75) Inventor: Makoto Masegi, Hazu-gun (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/046,177

(22) Filed: Jan. 16, 2002

(65) Prior Publication Data

US 2002/0096963 A1 Jul. 25, 2002

(30) Foreign Application Priority Data

Jan. 19, 2001 (JP) ........................................ 2001-012178

(51) Int. Cl.[7] .................................................. H02K 3/00
(52) U.S. Cl. ........................ 310/180; 310/179; 310/254
(58) Field of Search ................................ 310/180, 179, 310/184, 198, 201, 202, 208, 254, 258–261

(56) References Cited

U.S. PATENT DOCUMENTS

| | | | | |
|---|---|---|---|---|
| 5,449,962 A | * | 9/1995 | Shichijyo et al. | ........... 310/184 |
| 5,965,965 A | * | 10/1999 | Umeda et al. | ................ 310/52 |
| 5,998,903 A | | 12/1999 | Umeda et al. | |
| 6,011,332 A | * | 1/2000 | Umeda et al. | ................ 310/58 |
| 6,114,790 A | * | 9/2000 | Fei | .............................. 310/180 |
| 6,144,136 A | * | 11/2000 | Umeda et al. | .............. 310/254 |
| 6,198,190 B1 | * | 3/2001 | Umeda et al. | .............. 310/179 |
| 6,201,332 B1 | * | 3/2001 | Umeda et al. | .............. 310/184 |
| 6,281,609 B1 | * | 8/2001 | Itami et al. | ............... 310/68 B |

OTHER PUBLICATIONS

"Journal of Denso Technical Disclosure" Oct 15, 1999, pgs. 1–2.

* cited by examiner

Primary Examiner—Thanh Lam
(74) Attorney, Agent, or Firm—Oliff & Berridge, PLC

(57) ABSTRACT

In a vehicle AC generator, a stator winding includes star-connected three phase winding groups of a plurality of phase windings. Each phase winding group comprises series-connected two pairs of the phase windings that are 30 degree different in phase from each other. The phase windings of each pair are 180 degree different in phase from each other and series-connected by a first connection segment. The two pairs are series-connected by a second connection segment. Each phase winding is comprised of a plurality of U-shaped conductor segments, each of which has a turn portion, a pair of inclined portions having connection ends.

5 Claims, 10 Drawing Sheets

VEHICLE AC GENERATOR

CROSS REFERENCE TO RELATED APPLICATION

The present application is based on and claims priority from Japanese Patent Application 2001-12178 filed Jan. 19, 2001, the contents of which are incorporated herein by reference.

BACKGROUND OF THE INVENTION

1. Field of the Invention

The present invention relates to an AC generator for a vehicle such as a truck or a passenger car.

2. Description of the Related Art

Recently, an AC generator has become more compact and more powerful in order to be mounted in an engine compartment that has narrowed to meet demand for more spacious and comfortable passenger compartment.

U.S. Pat. No. 5,998,903 discloses one of compact and powerful AC generator in which a plurality of conductor segments is mounted to increase power and to improve cooling performance thereof. However, it is difficult for such an AC generator to provide different number of turns or segments to meet various specifications for various kinds of vehicles.

JOURNAL OF DENSO TECHNICAL DISCLOSURE No. 125-040 discloses a compact and powerful vehicle AC generator that aims at solving the above problem. However, it is still difficult to accommodate connection wires that connect a plurality of segments in a limited space.

SUMMARY OF THE INVENTION

Therefore, a main object of the invention is to provide an compact and powerful AC generator that can easily provide a different stator winding to meet various specifications.

According to a feature of the invention, a vehicle AC generator comprises a stator winding including star-connected three phase winding groups of a plurality of phase windings. Each of the three phase winding groups is comprised of series-connected two pairs of the phase windings that are 30 degree different in phase from each other. Each pair is comprised of a pair of the phase windings that is 180 degree different in phase from each other and series-connected by a first connection segment, and the two pairs are series-connected by a second connection segment. Each phase winding comprises a plurality of U-shaped conductor segments, each of which has a turn portion and a pair of inclined portions having connection ends. The stator winding includes a first coil-end group in which a plurality of the turn portions is disposed and a second coil-end group in which a plurality of pairs of the inclined portions is disposed. The first and second connection segments for the same phase winding group are disposed together and are separated from those for different phase winding groups.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

A preferred embodiment of the invention is described with reference to the appended drawings.

Figure 1:
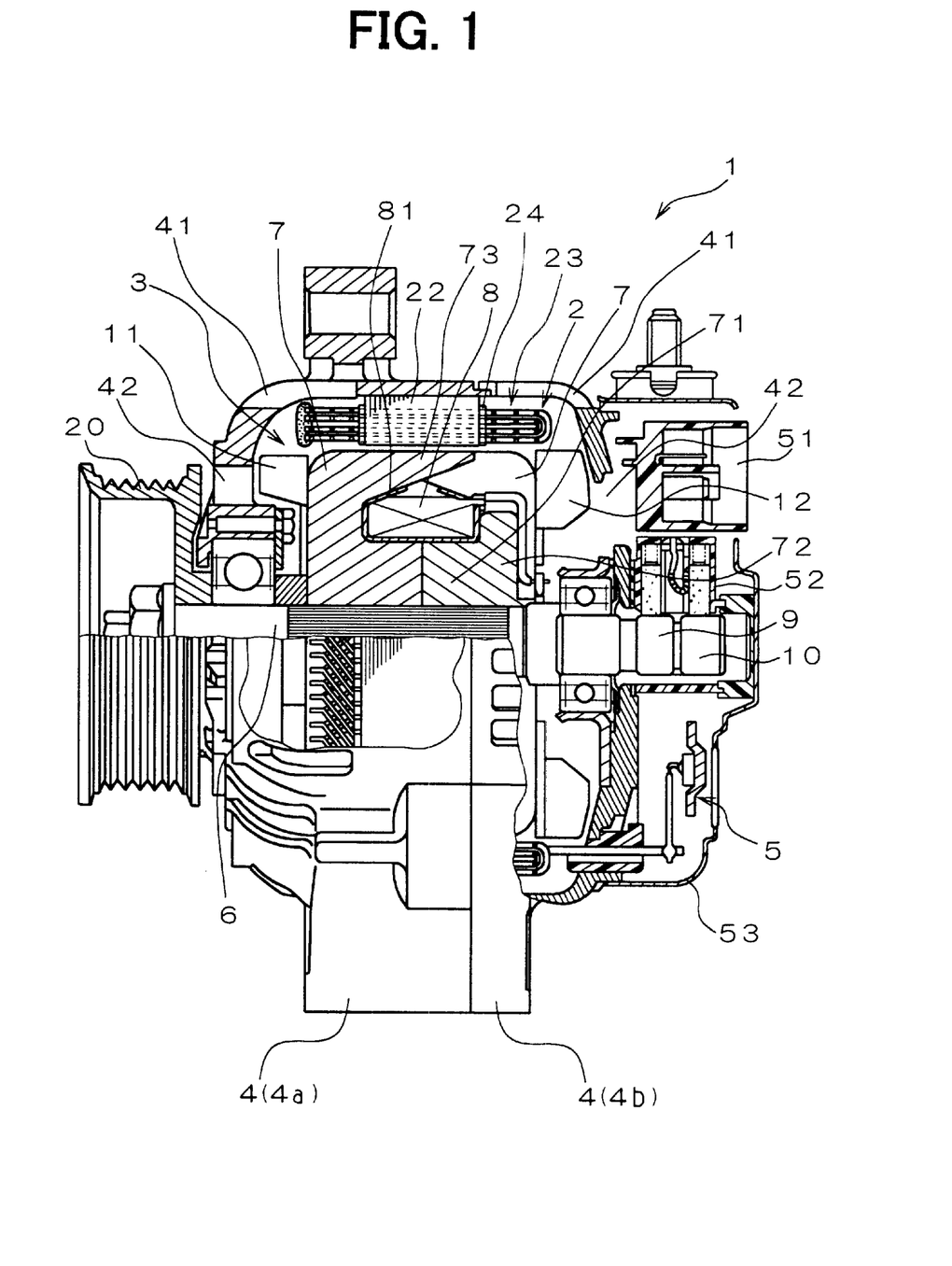
FIG. 1 is a cross-sectional side view of a vehicle AC generator according to a preferred embodiment of the invention.

As shown in FIG. 1, a vehicle AC generator according to a preferred embodiment is comprised of a stator 2, a rotor 3, a frame 4, a rectifier 5, etc.

The stator 2 is comprised of a stator core 22, a stator winding 23 and a plurality of insulators 24. The stator core 22 is a laminate of thin iron sheets that has a plurality (e.g. 72) of slots. The stator winding 23 is comprised of a plurality (e.g. 144) of conductor segments respectively disposed in the slots and connected to each other in a prescribed manner.

The rotor 3 rotates with a shaft 6. The rotor 3 is comprised of a pole core 7, a field coil 8, a pair of slip rings 9 and 10, a mixed flow type cooling fan 11 and a centrifugal cooling fan 12. The shaft 6 is connected to a pulley 20, which is rotated by a vehicle engine (not shown).

The pole core 7 is comprised of a pair of core members. Each core member has a cylindrical boss portion 71 fitted to the shaft 6, a disk portion 72 radially and outwardly extending from the boss portion 71 and a plurality of claw pole portions 73 axially extending from the periphery of the disk portion 72. The pair of core members is coupled with each other so that the claw pole portions 73 of one of the core members interleave the claw pole portions of the other. The field coil 8 is force-fitted to the inner wall of the claw pole portions 73. A sheet of insulation paper 81, which is impregnated with insulation resin and heat treated, encloses the field coil 8 to insulate the same from the pole core 7.

A mixed-flow type cooling fan 11 is fixed by welding or the like to one of the disk portions 72 near a pulley 20, and a centrifugal cooling fan 12 is also fixed to the other of the disk portions 72 away from the pulley 20 or near the slip rings 9 and 10. The projected area of the mixed-flow type cooling fan 11 in the rotation direction is smaller than the projected area of the centrifugal fan 12.

The frame 4 accommodates and supports the stator 2 and the rotor 3 so that the rotor 3 can rotate with the shaft 6 within the stator 2. The frame 4 is comprised of a front frame 4a and a rear frame 4b, which are fastened to each other by a plurality of fastening bolts (not shown). The frame 4 has a plurality of air discharging windows 41 at portions opposite the stator windings 23 projecting from the stator core 22 and a plurality of air-intake windows 42 at axial end portions thereof.

The rectifier unit 5, a voltage regulator 51 and a brush unit 52 are disposed outside the rear frame 4b, and a rear cover 53 is fixed to the rear frame to cover those members.

The rectifier unit 5 is connected to output lead wires of the stator winding 23, so that three-phase AC power of the stator winding 23 is converted to DC power.

If the field coil 8 is energized from outside while the rotor 3 of the vehicle AC generator 1 is rotated by a vehicle engine via the pulley 20, the claw pole portions 73 of the pole core 7 are magnetically excited so that three-phase AC power is generated. Consequently, DC power is provided at output terminals of the rectifier unit 5.

Figure 2:
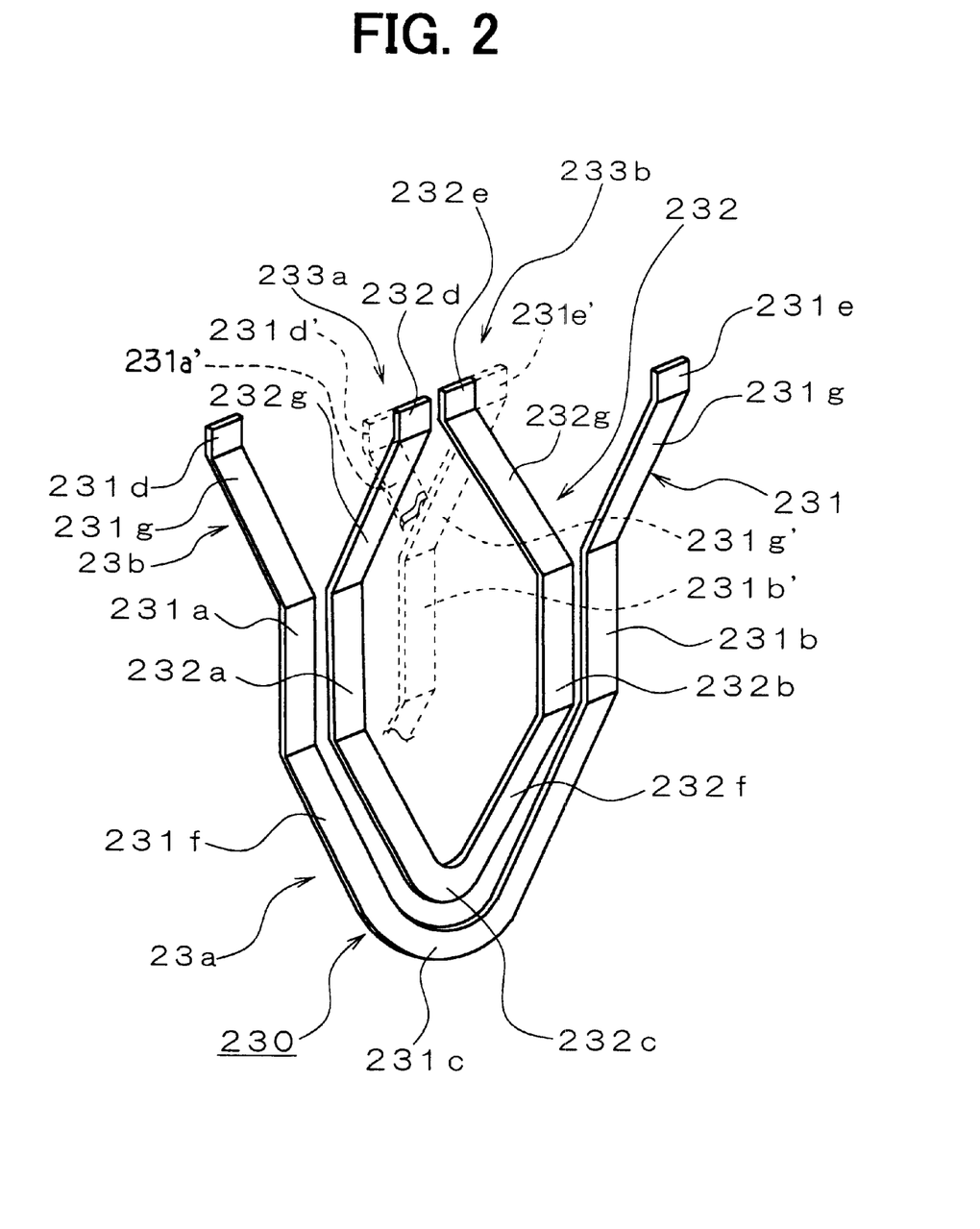
FIG. 2 is a perspective view of a set of conductor segments forming a stator winding of the vehicle AC generator according to the preferred embodiment.
Figure 3:
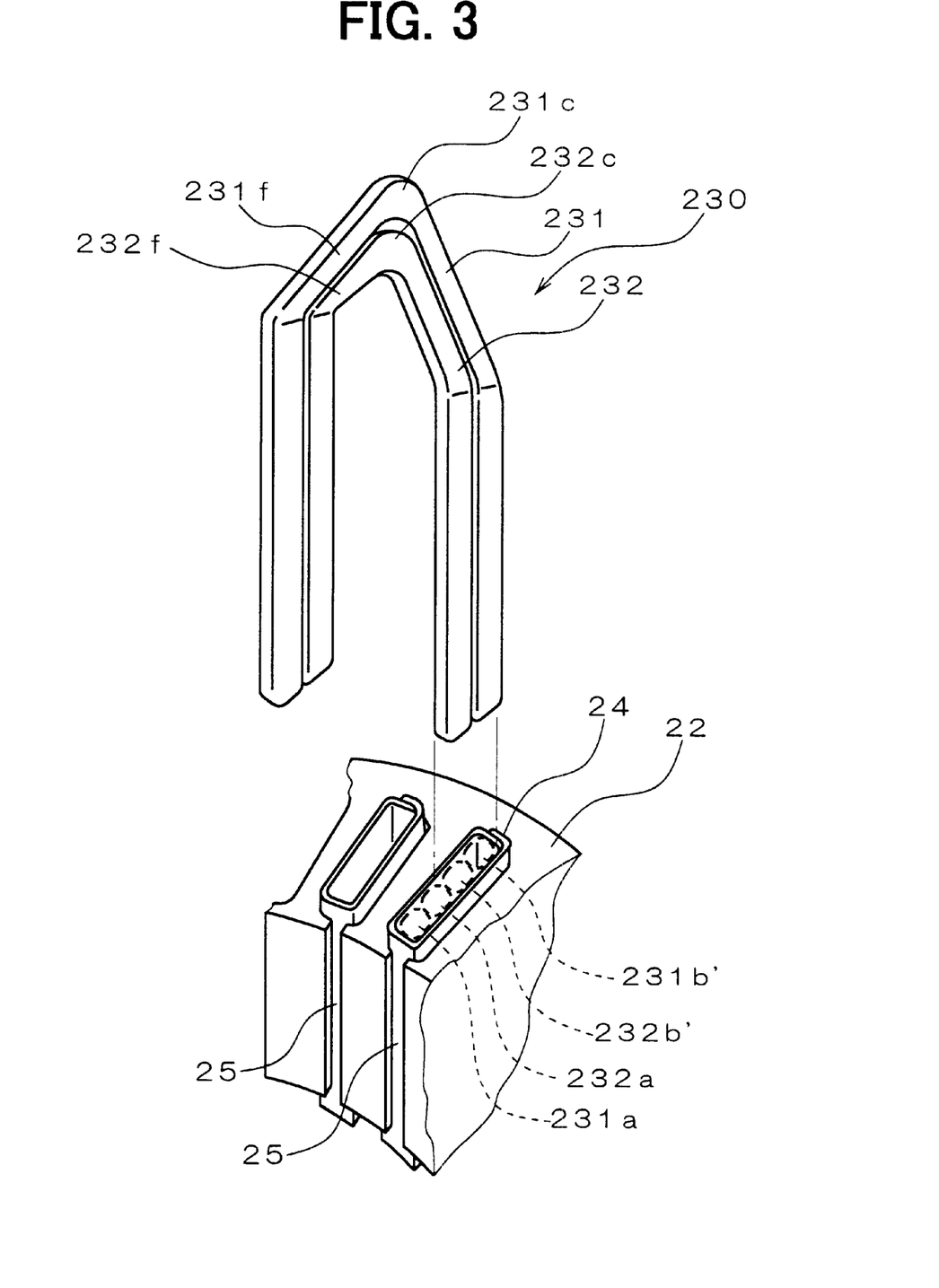
FIG. 3 is a schematic diagram of the set of conductor segments shown in FIG. 2 and a portion of a stator core in a step of assembling.

The stator winding 23 is comprised of a plurality of sets 230 of large and small U-shaped conductor segments 231 and 232, as shown in FIG. 2. Each conductor segment 231 or 232 has a pair of straight conductors disposed in the slot, and an even number (e.g. four) of the conductors is disposed in each slot 25. Each conductor segment also has a pair of inclined portion 231f and 231g or 232f and 232g that inclines with regard to the axis of the stator. As shown in FIG. 3, conductors 231a, 232a, 231b' and 231b' are aligned in a radial direction in four layers, an innermost layer, an inner middle layer, an outer middle layer and an outermost layer.

As shown in FIG. 2, one of the large conductor segments 231 has a conductor 231a disposed in the innermost layer of a first one of the slots 25 and the other conductor 231b disposed in the outermost layer of a second one of the slots 25 that is a pole-pitch spaced apart from the first one of the slots 25 in the clockwise direction. One of the small conductor segments 232 has a conductor 232a disposed in the inner middle layer of the first one of the slots 25 and the other conductor 232b disposed in the outer middle layer of the second one of the slots 25 that is a pole-pitch spaced apart from the first one of the slots 25 in the clockwise direction. Thus, the large conductor segment 231 mounts on the small segment at their turn portions 231c and 232c. The turn portions 231c of the large conductor segments 231 form outer coil ends of a first coil-end group, and the turn portions 232c of the small conductor segments 232 form inner coil ends of the first coil-end group.

On the other hand, the conductor 232a of the small conductor segment 232, which is disposed in the inner middle layer of the first one of the slots 25, is connected, at the other axial end of the stator core away from the turn portions 231c and 232c, to a conductor 231a' of one of the large conductor segments 231 disposed in the outermost layer of the second one of the slots 25, which is a pole-pitch spaced apart from the first one of the slots 25. A conductor 231b of one of the large conductor segments 232 that is disposed in the outermost layer of the first one of the slots 25 is, likewise, connected to the conductor 232b of the small conductor segments 232 disposed in the outer middle layer of the second one of the slots 25, which is a pole-pitch spaced apart from the first one of the slots 25 in the clockwise direction.

Accordingly, a joint 233b of the conductor 231b' disposed at the outermost layer of the first one of the slots 25 and the conductor 232b disposed at the outer middle layer of the second one of the slots 25 and a joint 233a of the conductor 231a' disposed at the innermost layer of the second one of the slots 25 and the conductor 232a disposed at the inner middle layer of the first one of the slots 25 are shifted from each other in the radial and circumferential directions. In other words, the inclined portion 231g' of the conductor 231b' disposed in the outermost layer and the inclined portion 232g of the conductor 232b disposed in the outer middle layer and the inclined portion of the conductor 231a' disposed in the innermost layer and the inclined portion 232g of the conductor 232a disposed in the inner middle layer 232a form coil ends of a second coil-end group in two neighboring concentric circular layers.

All the conductor segments 230 are inserted in all the slots 25 in the same manner as described above, and all the joints are welded or soldered by as an ultrasonic welder, an arc welder, or the like.

Figure 4:
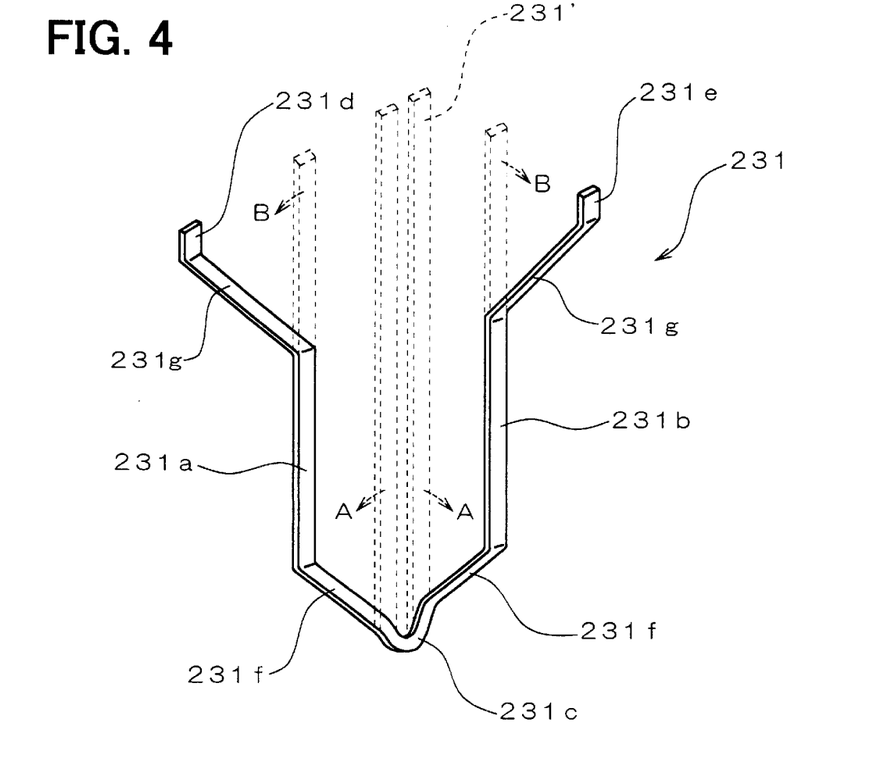
FIG. 4 is a step of forming a conductor segment.

As shown by dotted lines in FIG. 4, the large segment 231 is formed of a hairpin-shaped rectangular copper wire 231', which is expanded in directions A to form a U-shaped conductor segment having a pair of the inclined portions 231f and a pair of straight portions that include the conductor members 231a and 231b. The straight portions are respectively inserted into a pair of the slots 25, in the manner described above, together with the insulators 24. Thereafter, each of the straight portions is bent in circumferentially opposite outward directions to form a pair of the inclined portions 231g and a pair of the end portions 231d and 231e. The small segment 232 is also formed of a hairpin-shaped rectangular copper wire 231' in almost the same manner. However, each of the straight portions is bent in circumferentially inward directions to form a pair of the inclined portions 232g and a pair of the end portions 232d and 232e. Thus, the end portions 231d and 232d of the neighboring conductor members 231a and 232a are disposed to be away from each other, and the end portions 232e and 231e of the neighboring conductor members 231b and 231b are disposed to be away from each other. Thus, each of the end portions 231d and 231e of the large conductor segment 231 is connected, by welding or the like, to end portions of other small conductor segments 232, as described above, thereby forming a second coil-end group that projects from the other axial end of the stator core 22.

Ordinarily, a pair of the large segment 231 and the small segment 232 is piled and inserted into a pair of slots 25 so that the circumferentially opposite sides of the conductor members 231a, 231b, 232a and 232b are fitted to parallel inner walls of the corresponding slots 25 and so that the turn portion 231c of the large segment 231 mounts on the turn portion 232c of the small segment.

Figure 5:
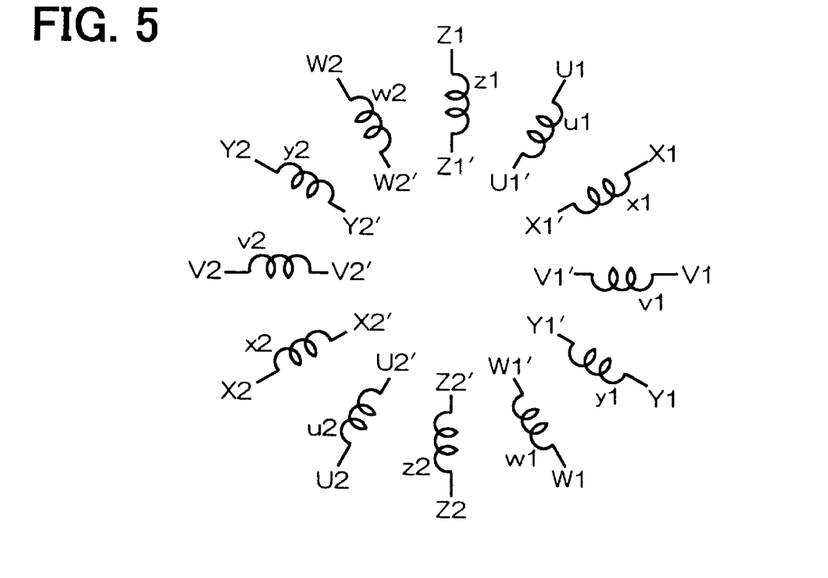
FIG. 5 is a diagram showing a phase-angle relationship of 12 phase windings that form a stator winding of the vehicle AC generator according to the preferred embodiment.

As shown in FIG. 5, the stator winding 23 is comprised of 12 phase windings x1, v1, y1, w1, z2, u2, x2, v2, y2, w2, z1 and u1. The phase windings are mounted in the stator core so that neighboring phase windings are 30 degree different in phase from each other. Each phase winding is comprised of a plurality of (e.g. 6) pairs of the large and small conductor segments 231 and 232, as described above. The 12 phase windings 23 have, respectively, opposite winding ends, X1–X1', V1–V1', Y1–Y1', W1–W1', Z2–Z2', U2–U2', X2–X2', V2–V2', Y2–Y2', W2–W2', U2–U2' Z1–Z1' and U1–U1'.

Figure 6:
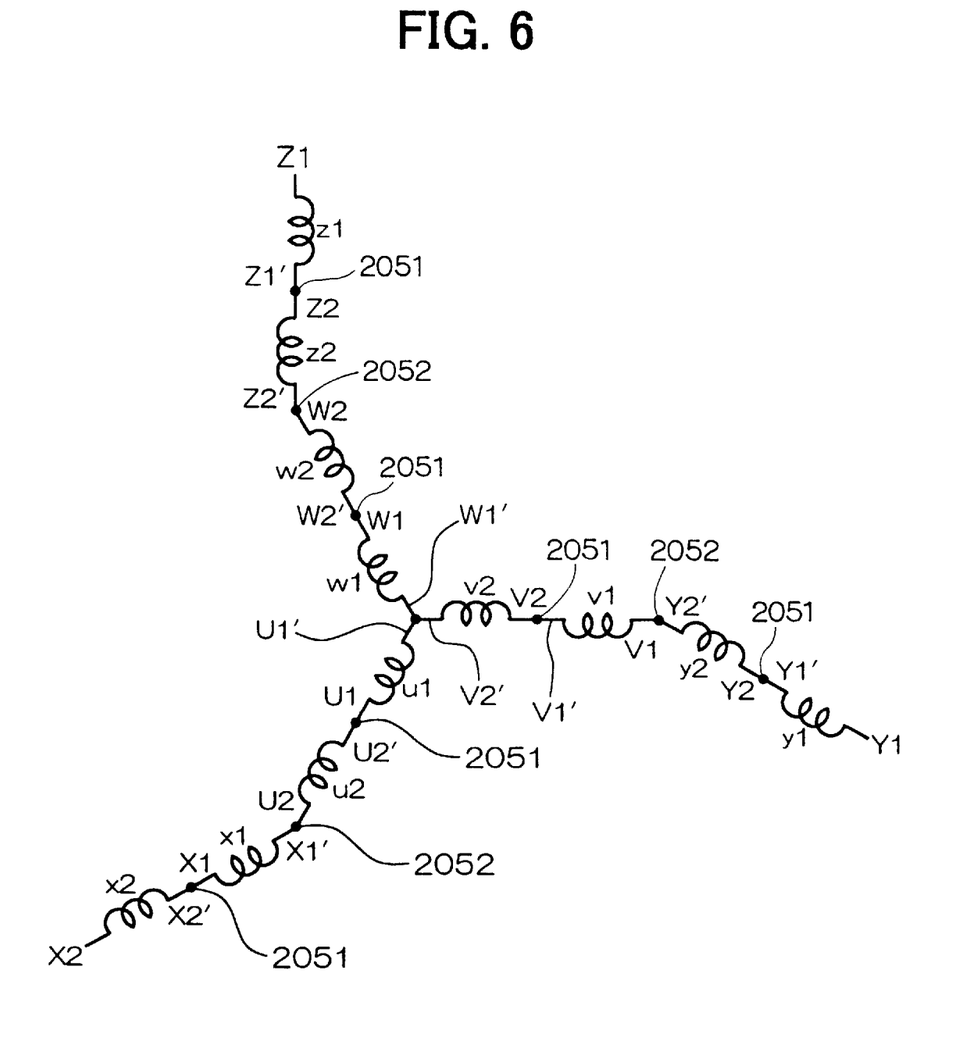
FIG. 6 is a schematic diagram showing the stator winding in which the 12 phase windings are connected in a prescribed manner.
Figure 7:
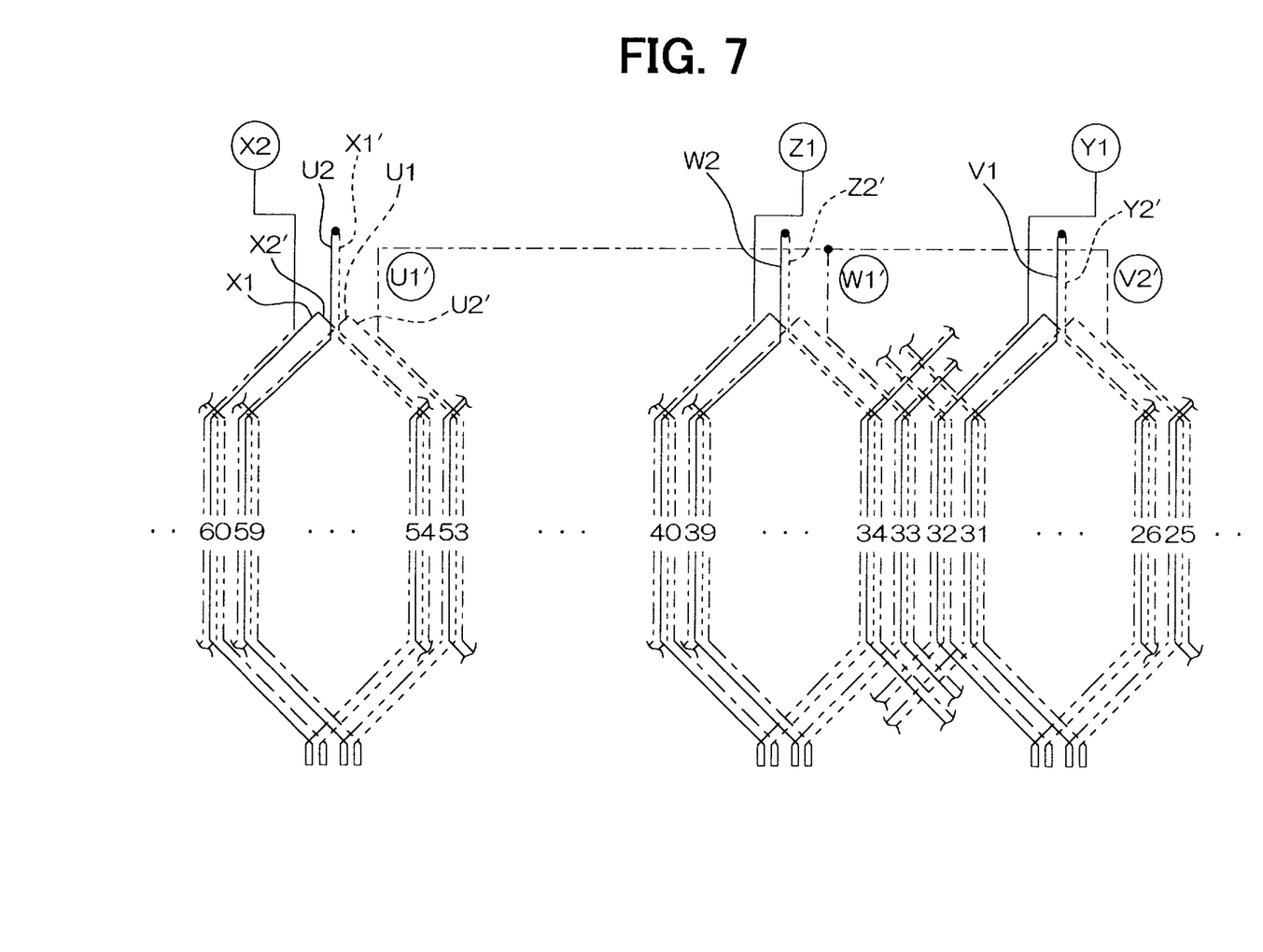
FIG. 7 is a winding diagram of the stator winding.

As shown in FIG. 6, the twelve phase windings form a star-connected stator winding that has three phase-winding groups. A first phase winding group x-u is comprised of series connected phase windings x2, x1, u2 and u1. Because the phase windings x1 and x2 are a 180-degree electric angle different in phase from each other, they are inversely connected via a connection wire that is formed of a first specific connection segment 230b. The connection wire forms a first connection portion 2051. The phase windings u1 and u2 are also a 180-degree electric angle different from each other and inversely connected via the connection wire that is formed of the first specific connection segment 230b. The phase windings x1 and u2, which are a 30-degree electric angle different in phase from each other, are also inversely connected via a connection wire that is formed of a second specific connection segment 230c. The connection wire forms a second connection portion 2052.

A second phase winding group y-v is comprised of series connected phase windings y1, y2, v1 and v2. The phase windings y1 and y2 are a 180-degree electric angle different in phase from each other and inversely connected via the connection wire that is formed of the first specific connection segment 230b and corresponds to the first connection portion 2051. The phase windings v1 amd v2 are also a 180-degree electric angle different in phase from each other and are also inversely connected via the connection wire that is formed of the first specific connection segment 230b and corresponds to the first connection segment 230b. The phase windings y2 and v1, which are a 30-degree electric angle different in phase from each other, are also inversely connected the connection wire that is formed of the second connection segment 230c and corresponds to the second connection portion 2052.

A third phase winding group z-w is comprised of series connected phase windings z1, z2, w2 and w1. The phase windings z1 and z2 are a 180-degree electric angle different in phase from each other and inversely connected via the connection wire that is formed of the first specific connection segment 230b and corresponds to the first connection segment 230b. The phase windings w1 and w2 are also a 180-degree electric angle different from each other and inversely connected via the connection wire that is formed of the first specific connection segment 230b and corresponds to the first connection segment 230b. The phase windings z2 and w2, which are a 30-degree electric angle different in phase from each other, are also inversely connected by the second connection segment 230c that corresponds to the second connection portion 2052.

Accordingly, the first, second and third phase winding groups are a 120-degree electric angle different from each other. The winding end U1' of the first phase winding group x-u, the winding end V2' of the second phase winding group y-v and the winding end W1' of the third phase winding group z-w are connected together to form a neutral point. The winding end X2 of the first phase winding group x-u, the winding end Y1 of the second phase winding group y-v and the winding end Z1 of the third phase winding group z-w form output lines.

Figure 8:
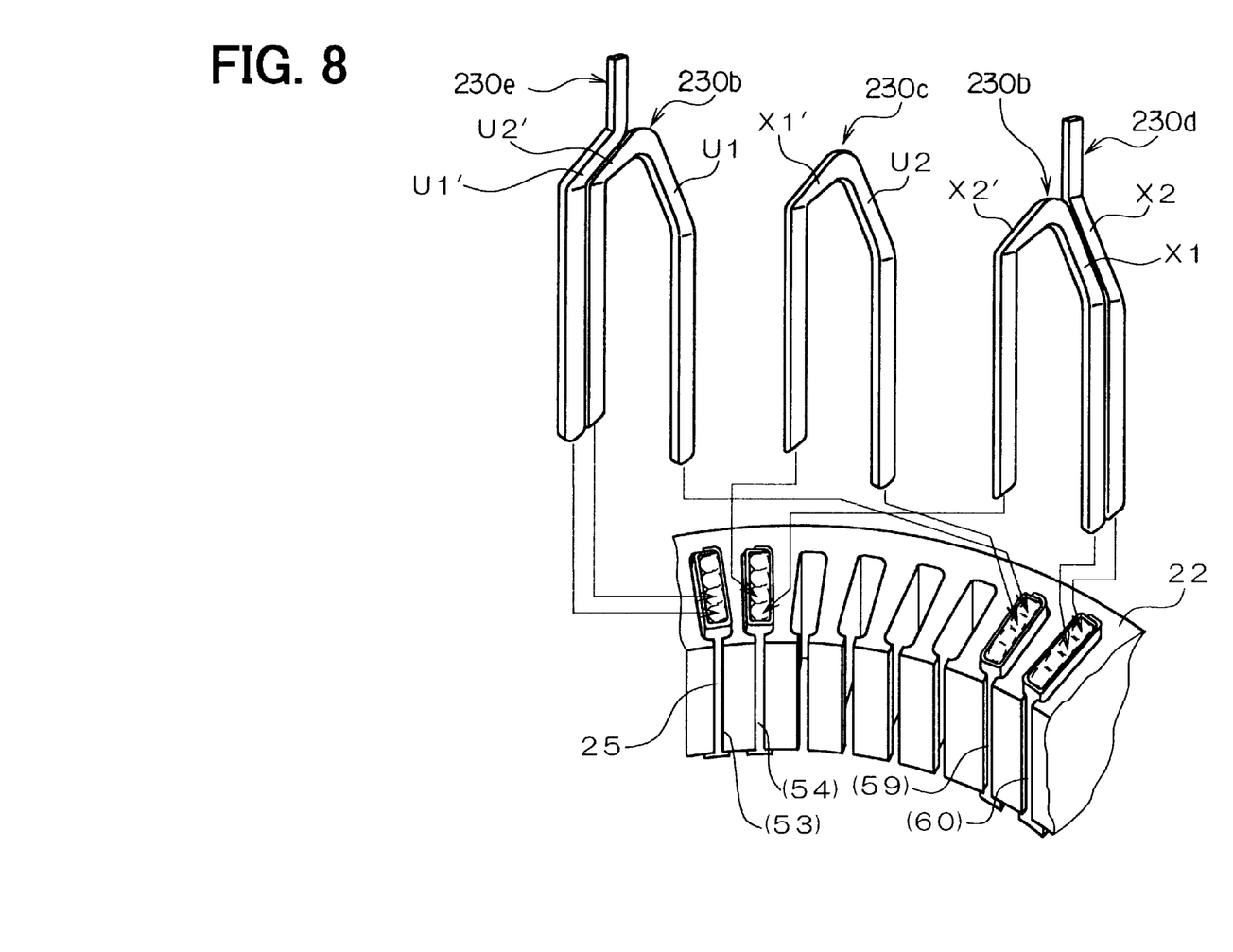
FIG. 8 is schematic diagram showing various connection segments extending from the stator core.

As shown in FIG. 8, the winding end X1 of the phase winding x1 that extends from the outer middle layer of number 60 of the slots 25 and the winding end X2' of the phase winding x2 that extends from the innermost layer of number 54 of the slots 25 are connected by the first connection segment 230b. The winding end U1 of the phase winding u1 extending from the outermost layer of number 59 of the slots 25 is also connected to the winding end U2' of the phase winding u2 extending from the inner middle layer of number 53 of the slots 25 by the first connection segment 230b.

The winding end U2 of the phase winding u2 extending from the outer middle layer of number 59 of the slots 25 and the winding end X1' of the phase winding x1 extending from the inner middle layer of number 54 of the slots 25 are connected by the second connection segment 230c.

The winding end X2 of the phase winding x2 is extended from the outermost layer of number 60 of the slots 25 by a third connection segment 230e, and the winding end U1' of the phase winding u1 is extended from the outermost layer of number 53 of the slots 25 by the third connection segment 230e.

Figure 9:
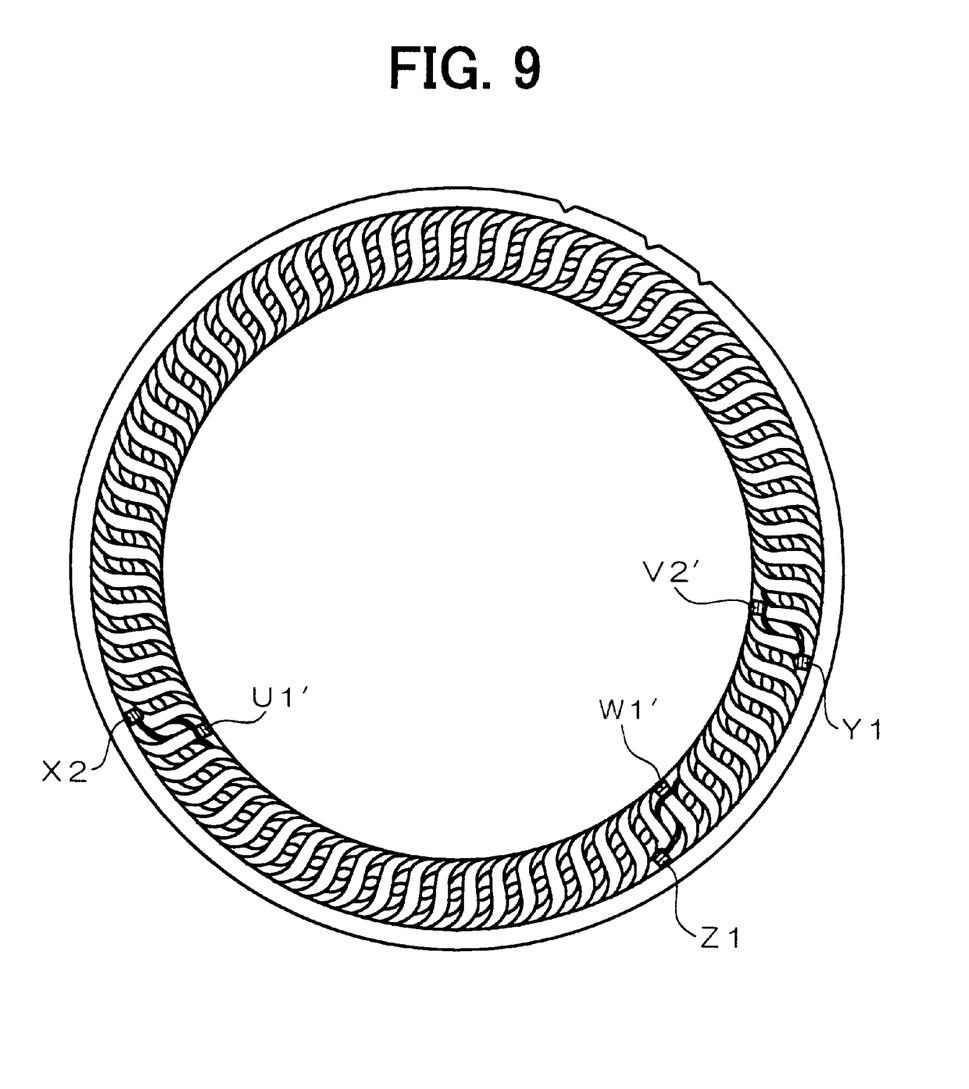
FIG. 9 is a plan view of a stator having lead wires of the vehicle AC generator according to the preferred embodiment.

As shown in FIG. 9, the winding ends X2 and U1' of the first phase winding group x-u are located to be close to each other, the winding ends Y1 and V2 of the second phase winding group y-v are located to be close to each other, and the winding ends Z1 and W1' of the third phase winding group z-w are located to be close to each other. On the other hand, the respective winding ends of the three phase winding groups are separated from each other in the circumferential direction.

Figure 10:
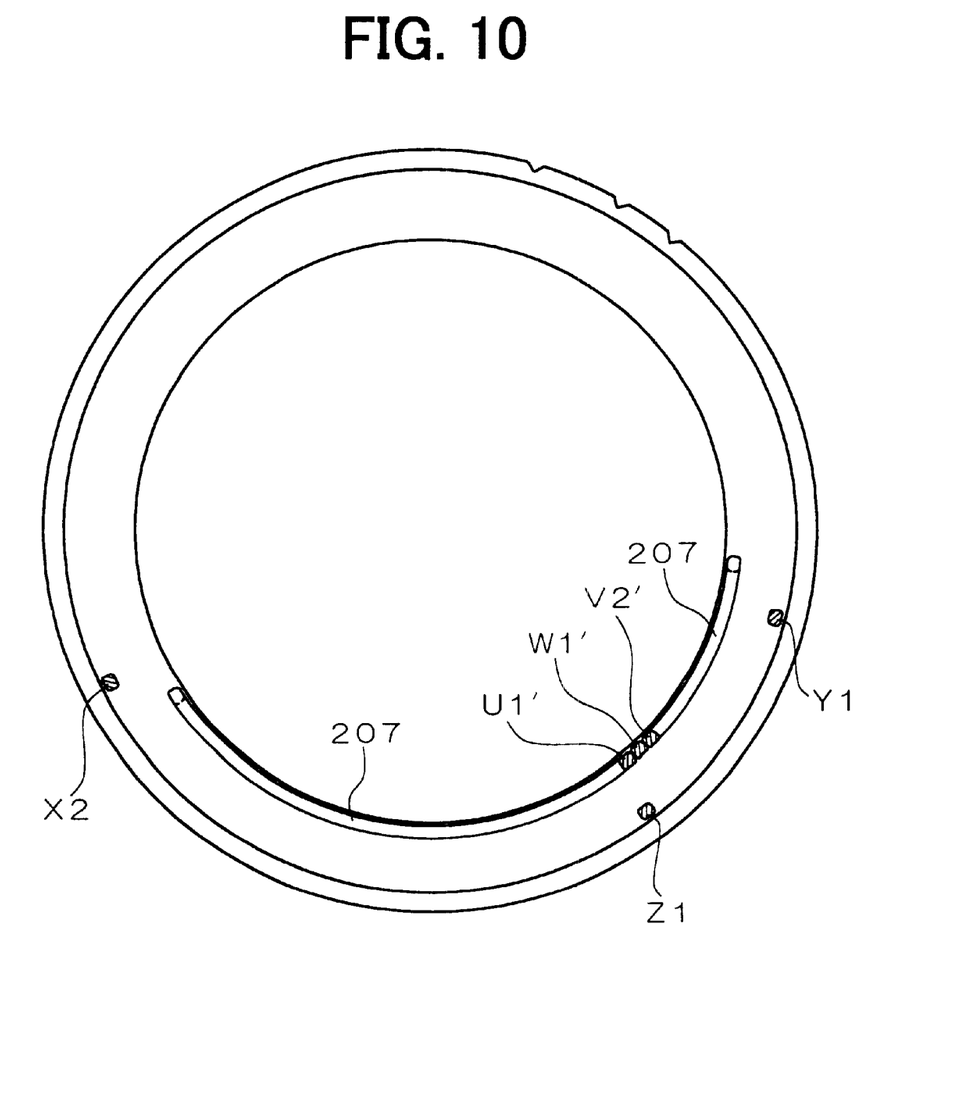
FIG. 10 is a schematic diagram of the stator having lead wires circumferentially extending along coil ends of the stator winding of the vehicle AC generator according to the preferred embodiment.

As shown in FIG. 10, three winding ends U1, V2' and W1' for the neutral points are extended by extensions 207 in the circumferential direction to get together. The extensions are fixed to top portions of the coil ends.

Figure 11:
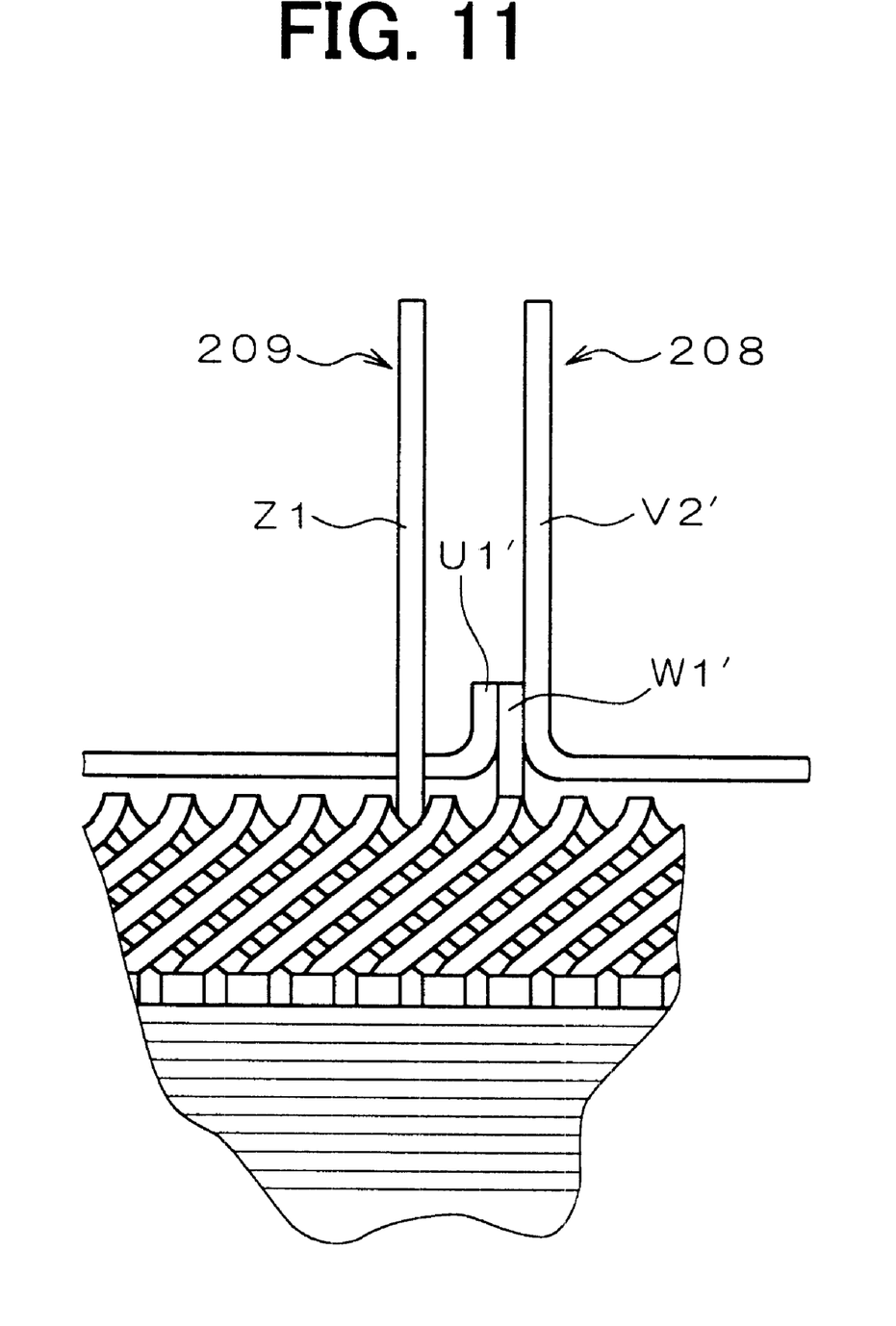
FIG. 11 is a fragmentary side view of the stator and lead wires.

As shown in FIG. 11, one (e.g. V2') of the three winding ends U1', V2' and W1' is extended to the rear end of the stator to form an output line 208 to be connected to a pair of diodes for the neutral point. The other three winding ends X2, Y1 and Z1 are also extended to the rear end of the stator to be connected to output lines 209 that are respectively connected to the rectifier unit 5.

Thus, the first and second connection segments, the neutral point and the output lines for one phase winding group are concentrated regularly but are separated from those for different phase winding groups. Therefore, it is easy to manufacture the stator.

The height of ceiling of the frame 4 opposite the outer side of the first coil-end group is preferably equal to or less than the height of the ceiling thereof opposite the inner side of the first coil-end group so that the extensions 207 can be disposed inside the output lines for the winding ends X2, Y1 and Z1.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator comprising:
    a rotor to be driven by a vehicle engine;
    a stator having a stator core disposed oppose said rotor and a stator winding mounted on said stator core, said stator winding including star-connected three phase winding groups of a plurality of phase windings;
    a rectifier unit connected to said stator winding; and
    a frame for supporting said rectifier unit, said rotor and said stator core,
    wherein
        each of said three phase winding groups comprises series-connected two pairs of said phase windings that are 30 degree different in phase from each other;
        each of said two pairs comprises a pair of said phase windings that is 180 degree different in phase from each other and series-connected by a first connection segment;

said series-connected two pairs are connected by a second connection segment;

each of said phase windings comprises a plurality of U-shaped conductor segments, each of which has a turn portion, a pair of inclined portions having connection ends;

said first and second connection segments for the same phase winding group are disposed together and separated from those for different phase winding groups; and said stator winding comprises a first coil-end group including a plurality of said turn portions disposed on an axial end of said stator core and a second coil-end group including a plurality of said pair of inclined portions on the other axial end of said stator core.

2. The vehicle AC generator as claimed in claim 1, wherein said first connection segment comprises said turn portion of said conductor segment to be integrated with said stator winding as a portion of said conductor segments.

3. The vehicle AC generator as claimed in claim 2, wherein said second connection segment comprises said turn portion of said conductor segment to be integrated with said stator winding as a portion of said conductor segments.

4. The vehicle AC generator as claimed in claim 1, wherein said stator winding comprises lead wires extending in a circumferential direction along said second coil-end group, for connecting said three phase winding groups.

5. The vehicle AC generator as claimed in claim 4, wherein a height of ceiling of said frame opposite an outer side of said first coil-end group is equal to or less than a height of said ceiling opposite an inner side of said first coil-end group, and said lead wires comprise output lines and neutral point connection lines disposed inside said output lines.

* * * * *